United States Patent
Yu et al.

(10) Patent No.: US 10,606,769 B2
(45) Date of Patent: Mar. 31, 2020

(54) TIME-RESTRICTED ACCESS TO FILE DATA

(71) Applicant: Huawei Technologies Co., Ltd., Shenzhen (CN)

(72) Inventors: Qun Yu, Beijing (CN); Jun Xu, Hangzhou (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 15/895,615

(22) Filed: Feb. 13, 2018

(65) Prior Publication Data

US 2018/0173643 A1 Jun. 21, 2018

Related U.S. Application Data

(63) Continuation of application No. PCT/CN2015/087667, filed on Aug. 20, 2015.

(51) Int. Cl.
*G06F 12/00* (2006.01)
*G06F 12/14* (2006.01)
(Continued)

(52) U.S. Cl.
CPC .......... *G06F 12/145* (2013.01); *G06F 3/0622* (2013.01); *G06F 9/545* (2013.01);
(Continued)

(58) Field of Classification Search
CPC ............... G06F 12/145; G06F 12/1027; G06F 12/0246; G06F 9/545; G06F 3/0622;
(Continued)

(56) References Cited

U.S. PATENT DOCUMENTS 7,337,296 B2 * 2/2008 Noel ....................... G06F 12/08
711/170
2003/0188169 A1 10/2003 Strongin et al.
(Continued)

FOREIGN PATENT DOCUMENTS

CN 102541984 A 7/2012
CN 102934094 A 2/2013
(Continued)

OTHER PUBLICATIONS

Machine Translation and Abstract of Chinese Publication No. CN104123229, Oct. 29, 2014, 12 pages.
(Continued)

*Primary Examiner* — Mardochee Chery
(74) *Attorney, Agent, or Firm* — Conley Rose, P.C.

(57) ABSTRACT

A file data access method and a computer system, where the method includes accessing a page global directory (PGD) of the process using PGD space when accessing first file data by a process, determining, based on access to the PGD and according to a first virtual address of the first file data in file system space, a first PGD entry in the PGD, linking a file page table of the process to the first PGD entry, where the file page table points to a physical address of the file data such that a processor retrieves a first physical address of the first file data in a memory according to the first virtual address using the PGD and the file page table, and accessing the first file data according to the first physical address.

21 Claims, 5 Drawing Sheets

(51) Int. Cl.
*G06F 3/06* (2006.01)
*G06F 9/54* (2006.01)
*G06F 12/02* (2006.01)
*G06F 12/1027* (2016.01)

(52) U.S. Cl.
CPC ...... *G06F 12/0246* (2013.01); *G06F 12/1027* (2013.01); *G06F 12/14* (2013.01); *G06F 12/0292* (2013.01); *G06F 2212/1032* (2013.01); *G06F 2212/1052* (2013.01); *G06F 2212/463* (2013.01); *G06F 2212/656* (2013.01); *G06F 2212/68* (2013.01); *G06F 2212/681* (2013.01); *G06F 2212/683* (2013.01); *G06F 2212/7201* (2013.01); *G06F 2212/7207* (2013.01)

(58) Field of Classification Search
CPC .. G06F 2212/68; G06F 12/0292; G06F 12/14; G06F 2212/7207; G06F 2212/7201; G06F 2212/681; G06F 2212/656; G06F 2212/463; G06F 2212/1052; G06F 2212/683; G06F 2212/1032
USPC ......................................................... 711/163
See application file for complete search history.

(56) References Cited

U.S. PATENT DOCUMENTS

| | | |
|---|---|---|
| 2014/0258663 A1 | 9/2014 | Zeng et al. |
| 2014/0281363 A1 | 9/2014 | Tian et al. |
| 2014/0337576 A1 | 11/2014 | Burton et al. |
| 2015/0193464 A1 | 7/2015 | Kwon et al. |
| 2016/0098224 A1 | 4/2016 | Miller et al. |

FOREIGN PATENT DOCUMENTS

| | | |
|---|---|---|
| CN | 103095758 A | 5/2013 |
| CN | 104077084 A | 10/2014 |
| CN | 104123229 A | 10/2014 |
| CN | 104732164 A | 6/2015 |
| WO | 2014138005 A1 | 9/2014 |

OTHER PUBLICATIONS

Machine Translation and Abstract of Chinese Publication No. CN104732164, Jun. 24, 2015, 17 pages.
Chen, F., et al., "A Protected Block Device for Persistent Memory," 30th Symposium on Mass Storage Systems and Technologies, Jun. 2-6, 2014, 12 pages.
Dulloor, S., et al., "System Software for Persistent Memory," Proceedings of the Ninth European Conference on Computer Systems, EuroSys, Apr. 13-16, 2014, 15 pages.
Foreign Communication From a Counterpart Application, PCT Application No. PCT/CN2015/087667, English Translation of International Search Report dated Apr. 27, 2016, 2 pages.
Machine Translation and Abstract of Chinese Publication CN102541984, Jul. 4, 2012, 5 pages.
Machine Translation and Abstract of Chinese Publication CN103095758, May 8, 2013, 17 pages.
Machine Translation and Abstract of Chinese Publication CN104077084, Oct. 1, 2014, 21 pages.
Foreign Communication From a Counterpart Application, Chinese Application No. 201580001269.4, Chinese Office Action dated Apr. 9, 2019, 4 pages.
Foreign Communication From a Counterpart Application, Chinese Application No. 201580001269.4, Chinese Search Report dated Mar. 27, 2019, 3 pages.
Foreign Communication From a Counterpart Application, European Application No. 15901513.0, Extended European Search Report dated Jul. 11, 2018, 10 pages.

* cited by examiner

TIME-RESTRICTED ACCESS TO FILE DATA

CROSS-REFERENCE TO RELATED APPLICATION

This application is a continuation of International Patent Application No. PCT/CN2015/087667 filed on Aug. 20, 2015, which is hereby incorporated by reference in its entirety.

TECHNICAL FIELD

Embodiments of the present disclosure relate to the field of computer systems, and in particular, to a file data access method and a computer system.

BACKGROUND

A file system is a method for storing and organizing computer data in which a file form is used to organize data stored in a memory and a file access policy is defined. Strictly speaking, the file system is a set of data management software implementing operations such as data storage, hierarchical data organization, and data access.

A conventional file system works in a kernel mode, while a user process runs in a user mode. If a process running in a user mode needs to access a file in a memory, for example, perform a read/write operation on the file, the process needs to execute a file system interface function. As executing the file system interface function belongs to a system call, the user mode is switched to a kernel mode. Then, the file system interface function is executed in the kernel mode to access the file in the memory. After file access is completed, the kernel mode is switched back to the user mode, and the process continues to run. The two switches between the user mode and the kernel mode consume resources and time.

SUMMARY

In view of this, embodiments of the present disclosure provide a file data access method and a computer system to implement secure access to file data in a user mode.

According to a first aspect, an embodiment of the present disclosure provides a file data access method, where the method is applied to a computer system, the computer system includes a processor and a memory, the memory is a non-volatile memory (NVM), an operating system runs on the processor, and the operating system uses a file system to manage file data in the memory, a process running on the operating system is allocated user space and kernel space during initialization of the process, where the user space of the process includes file system space and page global directory (PGD) space, the PGD space is virtual address space of a PGD and is used to be mapped to physical address space of the PGD in the memory, and the file system space is virtual address space of the file data and is used to be mapped to physical space of the file data in the memory, and the method includes accessing the PGD using the PGD space when access information of accessing first file data by the process is obtained, and determining, based on access to the PGD and according to a first virtual address of the first file data in the file system space, a first PGD entry in the PGD, linking a base address of a file page table of the process to the first PGD entry, where the file page table points to a physical address of the file data such that the processor retrieves a first physical address of the first file data in the memory according to the first virtual address using the PGD and the file page table, and accessing the first file data according to the first physical address.

With reference to the first aspect, in a first possible implementation of the first aspect, the method further includes disconnecting a link between the base address of the file page table and the first PGD entry in the PGD when access to the first file data ends.

With reference to the first aspect or the first possible implementation of the first aspect, in a second possible implementation of the first aspect, the memory further records a PGD page table, and the PGD page table points to a base address of the PGD, and accessing the PGD using the PGD space includes obtaining a preset address in the PGD space, and retrieving a second PGD entry in the PGD according to the preset address, and querying the PGD page table according to the second PGD entry, and accessing the PGD according to the base address, indicated by the PGD page table, of the PGD page.

With reference to the first aspect, the first possible implementation of the first aspect, or the second possible implementation of the first aspect, in a third possible implementation of the first aspect, the method further includes obtaining a second virtual address of the first PGD entry in the kernel space, and disconnecting the link between the base address of the file page table and the first PGD entry by operating the second virtual address when a process interrupt occurs during accessing the first file data by the process, and linking the base address of the file page table of the process to the first PGD entry by operating the second virtual address when the process interrupt ends.

With reference to the first aspect, the first possible implementation of the first aspect, the second possible implementation of the first aspect, or the third possible implementation of the first aspect, in a fourth possible implementation of the first aspect, the method further includes accessing the first file data, in the process to another thread, obtaining the second virtual address of the first PGD entry in the kernel space, and disconnecting the link between the base address of the file page table and the first PGD entry by operating the second virtual address when a thread scheduler schedules a thread, and accessing the first file data, in the process, linking the base address of the file page table of the process to the first PGD entry by operating the second virtual address when the thread scheduler schedules the other thread to the thread.

With reference to the first aspect, the first possible implementation of the first aspect, the second possible implementation of the first aspect, or the fourth possible implementation of the first aspect, in a fifth possible implementation of the first aspect, the method further includes PGDclearing a translation lookaside buffer (TLB) entry corresponding to the file page table in a TLB table when the link between the base address of the file page table and the first PGD entry is disconnected.

According to a second aspect, an embodiment of the present disclosure provides a computer system, including a processor and a memory, where the memory is an NVM, an operating system runs on the processor, and the operating system uses a file system to manage file data in the memory, a process running on the operating system is allocated user space and kernel space during initialization of the process, where the user space of the process includes file system space and PGD space, the PGD space is virtual address space of a PGD and is used to be mapped to physical address space of the PGD in the memory, and the file system space is virtual address space of the file data and is used to be mapped to physical space of the file data in the memory, and the operating system includes an access unit and a linkage unit, where the access unit is configured to access the PGD using the PGD space when access information of accessing first file data by the process is obtained, and the linkage unit is configured to determine, based on access to the PGD and according to a first virtual address of the first file data in the file system space, a first PGD entry in the PGD, link a base address of a file page table of the process to the first PGD entry, where the file page table points to a physical address of the file data such that the processor retrieves a first physical address of the first file data in the memory according to the first virtual address using the PGD and the file page table, and access the first file data according to the first physical address.

With reference to the second aspect, in a first possible implementation of the second aspect, when access to the first file data ends, the linkage unit is configured to disconnect a link between the base address of the file page table and the first PGD entry in the PGD.

With reference to the second aspect or the first possible implementation of the second aspect, in a second possible implementation of the second aspect, the memory further records a PGD page table, and the PGD page table points to a base address of the PGD, and when accessing the PGD using the PGD space, the access unit is further configured to obtain a preset address in the PGD space, retrieve a second PGD entry in the PGD according to the preset address, query the PGD page table according to the second PGD entry, and access the PGD according to the base address, indicated by the PGD page table, of the PGD page.

With reference to the second aspect, the first possible implementation of the second aspect, or the second possible implementation of the second aspect, in a third possible implementation of the second aspect, the operating system further includes an interrupt processing unit, when a process interrupt occurs during accessing the first file data by the process, the interrupt processing unit is configured to obtain a second virtual address of the first PGD entry in the kernel space, and disconnect the link between the base address of the file page table and the first PGD entry by operating the second virtual address, and when the process interrupt ends, the interrupt processing unit is configured to link the base address of the file page table of the process to the first PGD entry by operating the second virtual address.

With reference to the second aspect, the first possible implementation of the second aspect, the second possible implementation of the second aspect, or the third possible implementation of the second aspect, in a fourth possible implementation of the second aspect, the operating system further includes a thread scheduler, when scheduling a thread, accessing the first file data, in the process to another thread, the thread scheduler is configured to obtain the second virtual address of the first PGD entry in the kernel space, and disconnect the link between the base address of the file page table and the first PGD entry by operating the second virtual address, and when scheduling the other thread to the thread, accessing the first file data, in the process, the thread scheduler is configured to link the base address of the file page table of the process to the first PGD entry by operating the second virtual address.

With reference to the first aspect, the first possible implementation of the first aspect, the second possible implementation of the first aspect, the third possible implementation of the first aspect, or the fourth possible implementation of the first aspect, in a fifth possible implementation of the first aspect, the operating system further includes a cache clearing unit, where when the linkage unit disconnects the link between the base address of the file page table and the first PGD entry, the cache clearing unit is configured to clear a TLB entry corresponding to the file page table in a TLB table.

According a third aspect, an embodiment of the present disclosure provides a computer system, including a processor and a memory, where the processor and the memory are connected using a memory bus, the memory is an NVM, an operating system runs on the processor, and the operating system uses a file system to manage file data in the memory, a process running on the operating system is allocated user space and kernel space during initialization of the process, where the user space of the process includes file system space and PGD space, the PGD space is virtual address space of a PGD and is used to be mapped to physical address space of the PGD in the memory, and the file system space is virtual address space of the file data and is used to be mapped to physical space of the file data in the memory, and the NVM is configured to store a computer executable instruction, and when the computer system runs, the processor reads the computer executable instruction stored in the NVM such that the computer system executes the file data access method according to any one of claims 1 to 6.

According to the foregoing solutions, a base address of a file page table is linked to a first PGD entry only when first file data needs to be accessed in order to facilitate access to the first file data in an NVM in a user mode, to implement secure access to the first file data in the user mode.

DESCRIPTION OF EMBODIMENTS

The following clearly describes the technical solutions in the embodiments of the present disclosure with reference to the accompanying drawings in the embodiments of the present disclosure.

Figure 1:
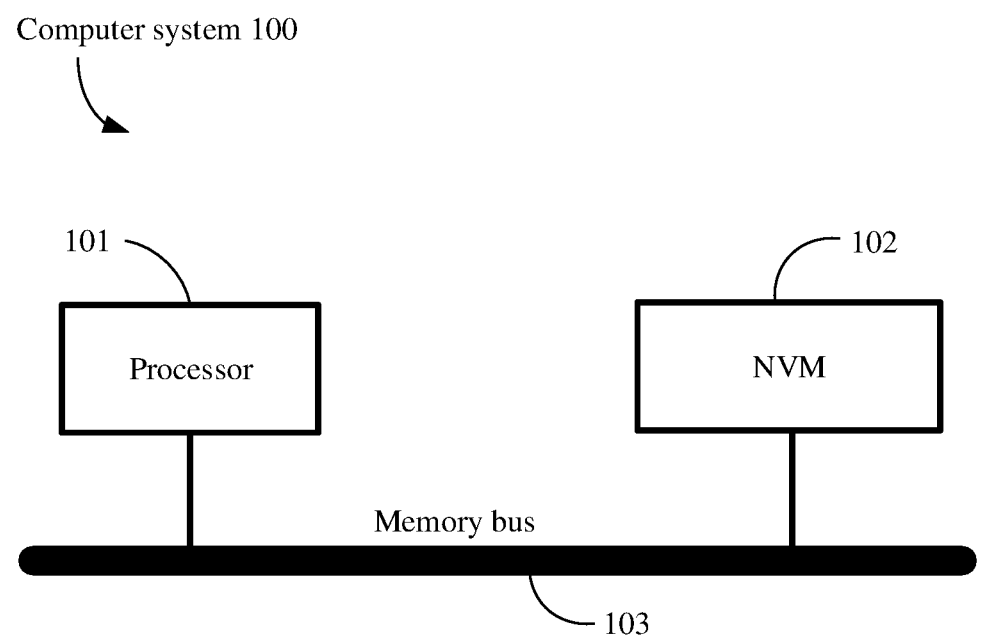
FIG. 1 is a schematic structural diagram of system hardware of an application scenario of a file data access method.

In a system scenario to which an embodiment of the present disclosure is applicable, as shown in FIG. 1, a computer system 100 includes a processor 101, an NVM 102, and a memory bus 103. The processor 101 may access the NVM 102 using the memory bus 103. The NVM 102 may be a phase change memory (PCM), a resistive random access memory (RRAM), a magnetic random access memory (MRAM), a ferroelectric random access memory (FRAM), or the like. A specific type of the NVM 102 is not limited in this embodiment of the present disclosure.

In this embodiment of the present disclosure, the NVM 102 is used as a memory, and is configured to implement memory functions including storing temporary data of the processor 101, storing operational data (including a computer instruction) used when the processor 101 runs, and temporarily storing data for exchange with an external memory (such as a hard disk or a disk) or the like. Compared with a conventional memory, for example, a dynamic random access memory (DRAM), in which data is lost when power fails, the NVM 102 has the following advantage when being used as a memory. The NVM 102 has a characteristic that no data is lost when power fails. After a recovery from the power failure, a running scenario before the power failure can be recovered in time using data in the NVM 102, and a task before the power failure continues to be executed.

In this embodiment of the present disclosure, the processor 101 may be a central processing unit (CPU). The CPU serves as a control core of a computer device to interpret and execute a computer instruction and process software data and/or hardware data in the computer. Certainly, the processor 101 may alternatively be another programmable logical unit.

An operating system runs on the processor 101, and another software program may run after being scheduled by the operating system. A person skilled in the art should understand that the operating system may use a virtual memory to run a software program and a virtual address range of the virtual memory is generally greater than a physical address range of the memory. This facilitates running of a complete program using the virtual memory. For example, if a computer has only a 4 megabyte (MB) memory, and when the computer needs to run a 16 MB program, the operating system may operate a virtual address to select to temporarily store which program fragment in the 4 MB memory for running, and if necessary, exchange a program fragment between the memory and an external disk such that the 16 MB program can run on the computer having only the 4 MB memory.

The processor 101 has a memory management unit (MMU), and the MMU is configured to translate a virtual address of the operating system to a physical address of a physical memory. In this embodiment of the present disclosure, the MMU is responsible for mapping a virtual address of the virtual memory to a physical address of the NVM 102 (i.e., memory) and providing memory access authorization for a hardware mechanism. If the MMU uses a multilevel page table to implement address translation from the virtual address to the physical address of the memory, each time translation from the virtual address to the physical address is performed, the MMU needs to access the memory for N+1 times (N is a quantity of levels of the page table). It can be learned that high overheads are caused each time address translation is performed. To increase a translation speed at which the MMU translates the virtual address to the physical address, a TLB table is used as an MMU buffer and an address mapping relationship recently found by the MMU is temporarily stored in the TLB table. Further, a TLB entry that reflects the address mapping relationship is recorded in the TLB table, and generally, a TLB entry is generated according to each page table entry (PTE) entry recently accessed by the MMU and the TLB table is updated using the newly generated TLB entry. Subsequently, when accessing the memory, the processor 101 first queries whether a TLB entry temporarily stored in the TLB table records a virtual address used for current access to the memory, and if the virtual address used for current access to the memory is found, reads data from the buffer or the memory directly according to a found physical address recorded in the TLB entry, or if the virtual address used for current access to the memory is not found, uses the MMU to perform translation from a virtual address to a physical address according to the multilevel page table, and usually temporarily stores a TLB entry used in current translation in the TLB table.

The operating system divides virtual address space of the virtual memory used by the operating system into user space and kernel space. During initialization of processes, a kernel of the operating system allocates, to each process, respective dedicated user space and a page directory that is used for addressing. For distinguishing a page directory that is used for addressing from other page directories and for ease of understanding, the following description is provided using a PGD as a page directory that is allocated to the process for addressing. In addition, all processes in the operating system share the kernel space, and each process may enter the kernel by means of a system call to trigger the kernel to use the kernel space to execute kernel code.

A person skilled in the art understands that a kernel mode is also referred to as a privileged mode, and is a mode in which the kernel of the operating system uses the kernel space to execute the kernel code. The kernel runs the kernel code in the kernel mode, and can use the kernel space to access a system storage device and an external device without limit. In addition, no processing resources occupied for access is allowed to be preempted. Correspondingly, a user mode is also referred to as an unprivileged mode in which only the user space can be used for limited access to a system storage device and an external device, and processing resources occupied by a process can be preempted. The process usually executes user code in the user mode. In addition, a process running in the user mode is executed after being switched to the kernel code by means of a system call, an interrupt, exception handling, or the like. That is, the process is switched from the user mode to the kernel mode. Correspondingly, after the kernel code is executed in the kernel mode, the process may be switched from the kernel mode back to the user mode.

In this embodiment of the present disclosure, because the NVM 102 has a characteristic that no data is lost when power fails, the operating system can use a file system to manage data in the NVM 102. Further, the file system organizes data in the NVM 102 into file data in a file form, correspondingly generates metadata describing an attribute of the file data, and stores the metadata in the NVM 102.

In order that the operating system accesses the file data in the NVM 102, file system space is obtained by dividing the virtual address space of the virtual memory. A file page table is stored in the NVM 102, and the file page table records a mapping relationship between a virtual address in the file system space and a physical address in the NVM 102. The file page table may be a one-level or multilevel page table, usually depending on a size of the virtual memory. If the NVM 102 is accessed, the MMU of the processor 101 uses the file page table to perform translation from a virtual address to a physical address, and uses the physical address obtained after translation to implement access to the file data in the NVM 102.

In other approaches, file system space is obtained by dividing kernel space of a virtual memory, and that a process accesses file data managed by a file system belongs to a system call. Therefore, when the process accesses the file data by means of a system call, it is required to perform switching between a user mode and a kernel mode twice. This undoubtedly causes a system resource loss and a time loss.

In view of the resource loss in the other approaches caused by switching between the user mode and the kernel mode, in this embodiment of the present disclosure, a part of a virtual address range obtained by dividing the user space separately used by the process is selected to serve as file system space. Therefore, the file system space is virtual address space of the file data in the user space of the process and is used to be mapped to physical space of the file data in the memory. An address mapping relationship between the file system space and physical address space of the NVM 102 is recorded in the file page table. There may be one or more file page tables that record the address mapping relationship. Correspondingly, one or more first PGD entries need to be determined in a global page directory of the process. Each first PGD entry is used to be correspondingly linked to a file page table, and a link correspondence is determined according to the address mapping relationship or a virtual address in the file system space. During execution of the user code by the process using the user space, a base address of the file page table is copied to a corresponding first PGD entry, that is, a link between the first global directory entry and the base address of the file page table is established such that the corresponding file page table can be retrieved using the first PGD entry. If the file page table is always linked to the first PGD entry during an entire running period of the process, the process can operate the file system space at any time and directly access the file data in the NVM 102. This reduces a system resource loss and a time loss caused by a system call. However, during the entire running period of the process, another unauthorized pointer of the process can also operate the file system space and access file data. Access performed by the unauthorized pointer undoubtedly brings security risks to the file data in the NVM 102.

In view of the foregoing security risks, the file data in the NVM 102 does not always need to be accessed during the entire running period of the process. Therefore, to implement secure access to the file data in the NVM in the user mode, a first improvement has been made in this embodiment of the present disclosure.

In the first improvement, a link between a first global directory entry and the base address of the file page table is established only when the process accesses the file data in the NVM 102, when the file data in the NVM 102 does not need to be accessed, the link between the first global directory entry and the base address of the file page table is disconnected.

After the first improvement is made, a specific implementation of an entire process of accessing the file data is as follows. If the process recognizes an instruction of accessing the file data in the NVM 102 or the process performs another operation of accessing the file data, access information of accessing the file data by the process is correspondingly determined. The operating system links the base address of the file page table to the first PGD entry only after obtaining the access information such that the MMU can retrieve the file page table from the first PGD entry when performing address translation. After access to the file data in the NVM 102 is completed, the base address of the file page table recorded in the first PGD entry is deleted, and the link relationship between the first PGD entry and the file page table is disconnected such that the MMU cannot retrieve the file page table from the first PGD entry. Therefore, the first improvement can prevent the following case. The MMU retrieves the file page table from the first PGD entry without authorization in another time period in which there is no need to access the file system to perform address translation.

In an implementation of the first improvement, a file system interface function is an interface of the file system. Access to all the file data in the NVM 102 can be completed by executing the file system interface function. In this implementation, if the process executes the file system interface function, the operating system may obtain the access information of accessing the file data by the process. Therefore, the file system interface function is modified in this implementation. The modifications include the following. 1. Adding code at the beginning of the file system interface function, where the code is used to write the base address of the file page table to the first PGD entry, and 2. further adding code at the end of the file system interface function. The code is used to clear the base address of the file page table stored in the first PGD entry, and clearance includes modification or deletion. For example, the code is executed to write other data (which is different from the base address of the file page table) to the first PGD entry for implementing clearance. For another example, the code is executed to perform a deletion operation on data in the first PGD entry. In this implementation, in another time period in which the process does not execute the file system interface function, no base address of the file page table is stored in the first PGD entry, and the MMU cannot retrieve the file page table from the first PGD entry such that the processor 101 cannot implement access to the file data. When the process executes the file system interface function, the process first writes the base address of the file page table to the first PGD entry, and the MMU can retrieve the file page table from the first PGD entry such that the processor 101 can operate the file system space to access the file data. Finally, when access to the file data ends, the base address of the file page table stored in the first PGD entry is cleared, the MMU cannot retrieve the file page table from the first PGD entry, and the processor 101 cannot implement access to the file data.

A person skilled in the art should understand that all functions (such as the file system interface function) used for managing files in the memory by the file system belong to a file system library function. In the other approaches, executing a function in the file system library function belongs to a system call, and then file data needs to be managed in a kernel mode. In this embodiment, execute permission on the file system library function is modified, and after the permission is modified, a function (including the file system interface function) in the file system library function can be executed in the user mode, and the file data in the NVM 102 can be managed in the user mode.

An optional optimized implementation is provided for the foregoing implementation of the first improvement. At the end of the file system interface function, not only the code used to clear the base address of the file page table in the first PGD entry, but also code used to clear a TLB entry corresponding to the file page table in the TLB table is added. After the process executes the file system interface function and access to the file data ends, not only the base address of the file page table recorded in the first PGD entry, but also the TLB entry corresponding to the file page table in the TLB table is cleared. In this way, even if an unauthorized pointer operates the file system space, a TLB entry corresponding to the file system space cannot be found in TLB entries temporarily stored in the TLB table to perform address translation, the MMU cannot retrieve the file page table from the first PGD entry for address translation, and the unauthorized pointer cannot access the file data in the NVM 102.

If the first improvement is expected to be implemented in the user mode, a second improvement is made in this embodiment of the present disclosure.

In the second improvement, PGD space different from the file system space is obtained by dividing the user space. The PGD space is virtual address space of a PGD and is used to be mapped to physical address space of the PGD in the memory. In this embodiment of the present disclosure, a mapping relationship between a physical address occupied by the PGD of the process and a virtual address in the PGD space is recorded in a PGD page table, and the PGD page table is stored in the memory. Because the PGD space is different from the file system space, correspondingly, a second PGD entry is also different from the first PGD entry used to link to the file page table. If the PGD page table is linked to the second PGD entry in the PGD of the process, the MMU can retrieve the PGD page table from the second PGD entry, and perform translation from a virtual address to a physical address using the global directory page table. In this way, when the process operates the PGD space in the user mode, data in each PGD entry in the PGD of the process can be modified. For example, the base address of the file page table is copied to the first PGD entry.

Figure 2:
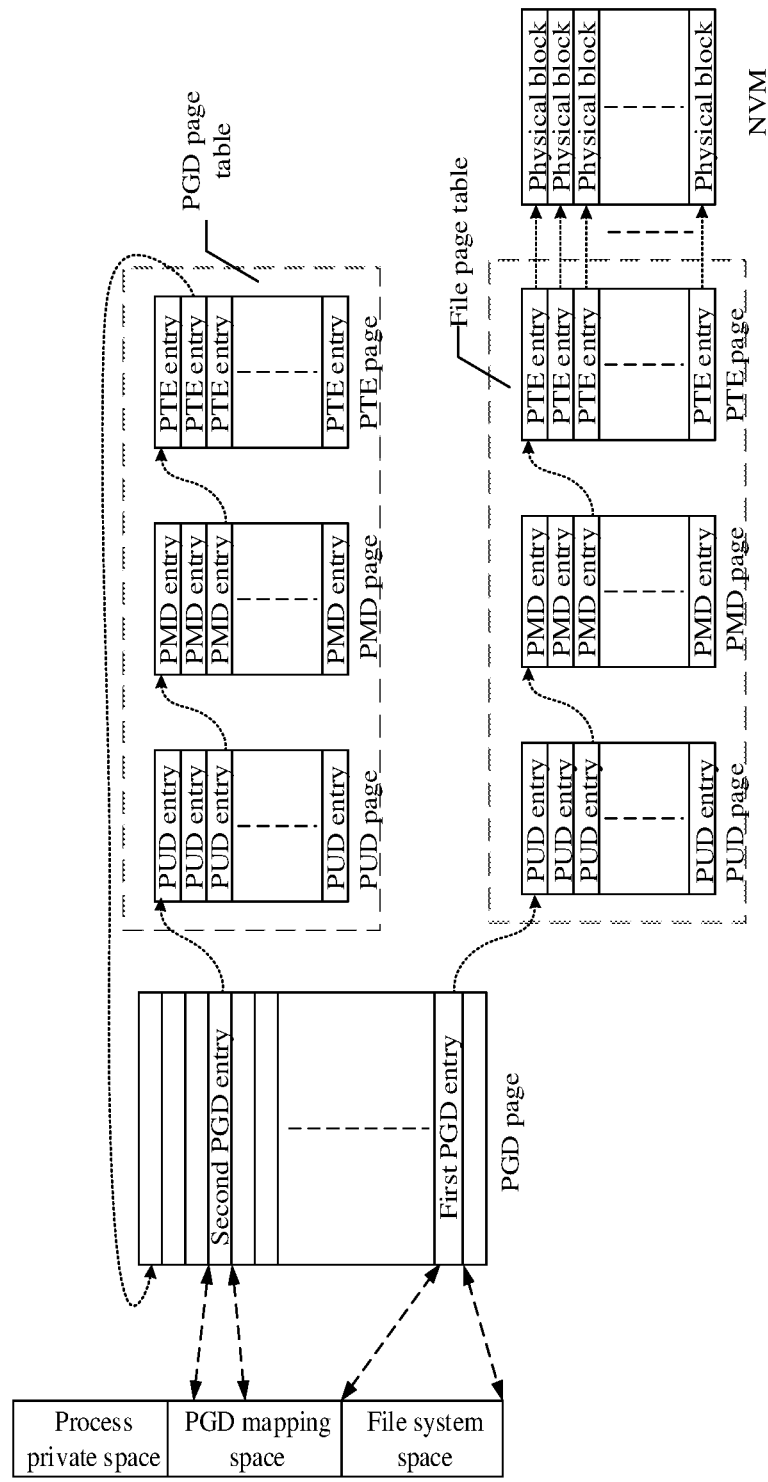
FIG. 2 is a schematic diagram of user space of a process and corresponding page tables of the process.

In an implementation of the second improvement, referring to FIG. 2, a PGD page in FIG. 2 is a page directory of the process. A second PGD entry is the second PGD entry for linking to the PGD page table, and a first PGD entry is the first PGD entry for linking to the file page table. There may be one or more first PGD entries, and different first PGD entries are linked to different file page tables. FIG. 2 provides only a link relationship between one first PGD entry and one file page table using an example. In FIG. 2, the PGD page table is a three-level page table including a page upper directory (PUD) page, a page middle directory (PMD) page, and a PTE) page, and the PUD page, the PMD page, and the PTE page are linked in sequence. As shown in FIG. 2, three segments of space are obtained by dividing the user space of the process, including process private space, PGD mapping space, and file system space. In this implementation, the process private space is used to run the process, and the PGD mapping space is used as the PGD space. A specific PGD entry in the PGD page that is a second PGD entry corresponding to the PGD mapping space can be determined according to only a virtual address in the PGD mapping space. In this implementation, the second PGD entry of the PGD page stores a base address of the PGD page table. The base address of the PGD page table is a base address of the PUD page in the PGD page table. A PTE entry is determined in the PTE page of the PGD page table according to a mapping relationship between the PGD mapping space and an address of the PGD page, and the PTE entry is used to store the first physical address of the PGD page. In this way, the virtual address in the PGD mapping space can be translated to a physical address of the PGD page according to the PGD page table linked to the second PGD entry. Further, the process can modify data recorded in a first PGD entry by operating a virtual address of the first PGD entry in the PGD mapping space in the user mode, for example, by operating the virtual address of the first PGD entry to write the base address of the file page table to the first PGD entry, and for another example, by operating the virtual address of the first PGD entry to delete or modify the data recorded in the first PGD entry.

During access to the file data in the NVM in the user mode, a process interrupt may occur on a process. A type of the process interrupt may be a hardware interrupt or a software interrupt. This is not limited herein. Trigger conditions for triggering the process interrupt may be various, or may be existing conditions for triggering the interrupt. This is not limited herein either. To prevent an unauthorized pointer from operating the file system space during the process interrupt to access the file data, a third improvement is made in this embodiment of the present disclosure, and the third improvement is made mainly for modifying an interrupt function for processing an interrupt.

A person skilled in the art should understand that some virtual addresses have been determined in the kernel space of the operating system and the virtual addresses are mapped to physical addresses of the PGD of the process. That is, the virtual addresses are virtual addresses of the PGD of the process in the kernel space and are used by the PGD of the process running in the kernel. Based on the virtual addresses, the following modifications to the interrupt function that is used to process the process interrupt are made in the third improvement in this embodiment of the present disclosure.

1. Code is added at the beginning of the interrupt function. The virtual addresses can be operated by executing the code, to clear the base address of the file page table recorded in first PGD entry and disconnect the link between the first PGD entry and the base address of the file page table.

2. Code is added at the end of the interrupt function. The virtual addresses can be operated by executing the code, to write the base address of the file page table to the first PGD entry and link the base address of the file page table to the first PGD entry.

Based on the third improvement, after the process interrupt occurs on the process, the kernel executes the interrupt function in the kernel mode. First operating the virtual addresses to disconnect the link between the file page table of the process and the first PGD entry, then performing interrupt processing, where the interrupt processing may be an existing processing manner such as executing an interrupt procedure, operating the virtual addresses to relink the base address of the file page table to the first PGD entry after the interrupt processing is completed. In this way, in the time period of the interrupt processing, even if an unauthorized pointer operates the file system space, the unauthorized pointer cannot use the file page table to access the file data. This ensures protection for the file data in the NVM during the interrupt processing.

In this embodiment of the present disclosure, the interrupt function may be further modified to ensure that the file data cannot be accessed during the interrupt processing in order to increase a safety factor. The further modification to the interrupt function is that the code added at the beginning of the interrupt function can also implement the following function of clearing the TLB entry corresponding to the file page table in the TLB table, where the TLB entry corresponding to the file page table records an address translation relationship between a virtual address of the file system space and a physical address of the file data. In this way, when the kernel executes the code added at the beginning of the interrupt function, not only the link between the file page table and the first PGD entry is disconnected, but also the TLB entry corresponding to the file page table in the TLB table is cleared, during the interrupt processing, a system risk or even an abnormal crash caused when an unauthorized pointer pointing to the file system space can access the file data using the file page table or access the file data in the NVM using the TLB entry in the TLB table can be avoided.

A person skilled in the art should understand that a process may have one or more threads at the same time, but for a processor core, only one machine instruction can be executed at any moment. Each thread can execute an instruction only when the thread has rights to use the processor core. Macroscopically, concurrent running of multiple threads means that all the threads obtain, in turn, rights to use the processor core to execute their respective tasks. In a running thread pool, there are multiple ready threads waiting for the processor core, and the kernel needs to run a segment of code to implement a thread scheduler. The thread scheduler is responsible for thread scheduling, and the thread scheduling is assigning, to multiple threads according to a specific mechanism, rights to use the processor core.

Threads in the process share the user space of the process, and therefore, all the threads in the process also share the file system space that is obtained by dividing the user space of the process. Generally, each thread executes a different task, and not all of multiple parallel threads need to access the file data. To prevent an unauthorized pointer in the parallel threads from modifying the file data, a fourth improvement is made in this embodiment of the present disclosure.

The fourth improvement is to modify a thread scheduling policy. The modified thread scheduling policy can implement the following two processing methods. In a first processing method, if a thread currently running in the processor is accessing the file data, but a time slice allocated by the thread scheduler to the thread has expired, during scheduling the thread to another thread, the thread scheduler disconnects the link between the base address of the file page table and the first PGD entry, and preferably, further clears the TLB entry corresponding to the file page table in the TLB table such that even if the other thread operates the file system space without authorization, the file page table can be prevented from being used to access the file data in the NVM, and no TLB entry that is used to access the file data in the NVM can be found. In a second processing method, during scheduling from the other thread to the thread accessing the file data, the thread scheduler links the base address of the file page table to the first PGD entry to ensure that the scheduled thread can continue to access the file data in the NVM. Using the improved thread scheduling policy, an unauthorized pointer from another thread can be prevented from accessing the file data in the NVM without authorization in a time slice in which the other thread is executed.

In this embodiment of the present disclosure, optionally, to clear the TLB entry corresponding to the file page table in the TLB table in the user mode, an implementation of replacing the TLB entry in the TLB table can be used. The following provides three replacement manners with respect to different structures of the TLB table.

In a first replacement manner, the TLB table is implemented using a TLB fully-associative structure. To clear the TLB entry corresponding to the file page table in the TLB table, even if only some TLB entries in the TLB table are TLB entries corresponding to the file page table, a virtual address that does not belong to the file system space still needs to be accessed to generate new TLB entries, and all TLB entries in the TLB table are replaced with the new TLB entries.

In a second replacement manner, the TLB table is implemented using a TLB set-associative structure. To clear the TLB entry corresponding to the file page table in the TLB table, TLB sets in the TLB table that include the TLB entry corresponding to the file page table are first determined, a virtual address that does not belong to the file system space is accessed to generate new TLB entries, and all TLB entries in the determined TLB sets (including the TLB entry corresponding to the file page table) are replaced with the new TLB entries.

In a third replacement manner, the TLB table is implemented using a TLB direct-associative structure. To clear the TLB entry corresponding to the file page table in the TLB table, a virtual address that does not belong to the file system space is accessed to generate new TLB entries, and the TLB entries corresponding to the file page table in the TLB table are replaced with the new TLB entries one by one.

Method Embodiment of the Present Disclosure

Figure 3:
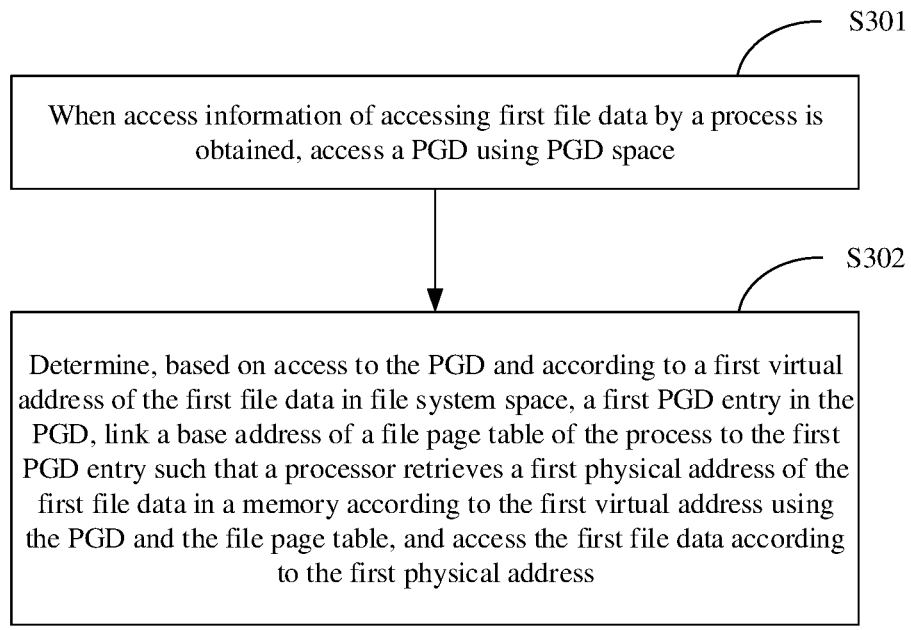
FIG. 3 is a basic flowchart of an example of a file data access method.

Based on a hardware environment provided by the foregoing computer system and with reference to the foregoing improvements, a basic implementation procedure of a file data access method and an optional optimized detailed implementation procedure thereof are provided. The basic implementation procedure of the file data access method is shown in FIG. 3. However, for ease of description, only a part related to this embodiment is shown in FIG. 3.

First, it is reiterated that the file data access method provided in this method embodiment of the present disclosure is applied to a computer system. The computer system includes a processor and a memory, where the memory is an NVM, an operating system runs on the processor, and the operating system uses a file system to manage file data in the memory. Compared with the other approaches, to implement the present disclosure, the following improvements are made to the computer system.

A process running on the operating system is allocated user space and kernel space during initialization of the process, where the user space of the process includes file system space and PGD space, the PGD space is virtual address space of a PGD and is used to be mapped to physical address space of the PGD in the memory, and the file system space is virtual address space of the file data and is used to be mapped to physical space of the file data in the memory.

Based on the foregoing improved computer system, the following adaptively describes the method embodiment of the file data access method in detail. For ease of description, the following basic procedure of the file data access method or an optional detailed procedure of the basic procedure is provided from a prospective of a single process. It should be understood that these method procedures are applicable to each process running in the computer system, and operations such as deletion, equivalent replacement, and addition may be made to some steps or technical features in the procedures without departing from the spirit of the present disclosure.

Referring to FIG. 3, the basic procedure of the file data access method includes step S301 and step S302.

Step S301: When access information of accessing first file data by the process is obtained, access the PGD using the PGD space.

It should be known that the first file data is a part or all of the file data stored in the NVM, and the first file data may be separately stored in a file, or may be dispersedly stored in multiple files.

When a user uses the process running in the operating system to access the first file data in the NVM, or the process running in the operating system executes code to access the first file data in the NVM, the access information of the first file data can be recorded in the computer system. The access information indicates a status of access to the first file data, and therefore whether the current process accesses the first file data can be determined using the access information. The access information is usually recorded in a register or the NVM, but in the present disclosure, no limitation is imposed on a manner of recording the access information.

Optionally, the access information is recorded in the computer system only when the first file data is accessed. If the first file data is not accessed, the access information of the first file data is not recorded in the computer system. In this way, an event that the current process starts accessing the first file data can be determined according to a generation time of the access information of the first file data.

Optionally, the computer system records the access information of the first file data in real time. However, recorded content of the access information when the first file data is accessed is different from recorded content of the access information when the first file data is not accessed. In this embodiment, the event that the current process starts accessing the first file data can be determined according to the recorded content of the access information of the first file data.

In this embodiment, if the processor determines, according to the access information of the first file data, that the event that the current process starts accessing the first file data occurs, step S301 of accessing the PGD using the PGD space is performed.

It should be known that the PGD space is virtual address space of the PGD. When the MMU can learn of an address translation relationship between the PGD space and the physical address space of the PGD in the memory, access to a corresponding PGD entry in the PGD can be implemented by operating a virtual address of the PGD space.

Step S302: Determine, based on access to the PGD and according to a first virtual address of the first file data in the file system space, a first PGD entry in the PGD, link a base address of a file page table of the process to the first PGD entry, where the file page table points to a physical address of the file data of the process such that the processor retrieves a first physical address of the first file data in the memory according to the first virtual address using the PGD and the file page table, and access the first file data according to the first physical address.

The file page table records an address mapping relationship between the file system space and physical address space of the NVM. A PTE entry of a PTE page in the file page table points to a physical address of the file data. There may be one or more file page tables for recording the address mapping relationship between the file system space and the physical address space of the NVM. One file page table correspondingly needs to be linked to one PGD entry, and a link correspondence is determined according to a translatable virtual address of the file page table.

Therefore, in step S302, the first PGD entry can be determined according to the first virtual address of the first file data. The first PGD entry is used to be linked to a file page table that can be used for performing translation on the first virtual address. Further, there is a PTE entry pointing to the physical address of the first file data in the PTE page of the file page table.

When implementing translation from the first virtual address to the first physical address, the processor first queries whether a TLB entry that matches the first virtual address is temporarily stored in a TLB table. If the TLB entry that matches the first virtual address is found, a physical address recorded in the TLB entry and mapped to the first virtual address is determined as the first physical address, and then the first file data in the NVM can be accessed by directly using the first physical address. In this embodiment, if the first file data is accessed for the first time using the first virtual address, the TLB entry that matches the first virtual address cannot be found in the TLB table.

If the processor does not find, in the TLB table, the TLB entry that matches the first virtual address, the MMU performs address translation on the first virtual address. Further, the MMU first finds a corresponding first PGD entry in the PGD according to an address size of the first virtual address, retrieves the file page table from the first PGD entry, further retrieves the PTE page according to the first virtual address from the file page table sequentially from an upper page level to a lower page level, and searches the PTE page for a PTE entry for translating the first virtual address. The PTE entry points to the first physical address.

FIG. 2 is used an example for describing an address translation process in which the MMU translates a first virtual address to a first physical address. First, a corresponding first PGD entry is determined in a PGD page according to an address size of the first virtual address, a corresponding PUD entry is found, according to the address size of the first virtual address, in a PUD page to which the first PGD entry is linked, a corresponding PMD entry is found, according to the address size of the first virtual address, in a PMD page to which a PUG entry is linked, finally, a corresponding PTE entry is found, according to the address size of the first virtual address, in a PTE page to which a PMG entry is linked. The PTE entry points to the first physical address.

After translating the first virtual address to the first physical address, the processor uses the first physical address to access the first file data in the NVM using a memory bus.

In this embodiment, step S301 and step S302 are performed to implement that the file page table is linked to the corresponding first page directory entry only when the file data in the NVM needs to be accessed. Before the file data in the NVM is accessed, the file page table is not linked to the corresponding first page directory entry. In this way, before the file data in the NVM is accessed, the file data in the NVM can be prevented from being accessed without authorization by operating the file system space.

In an optional detailed implementation of this method embodiment, a PGD page table is further recorded in the memory, and the PGD page table points to a base address of the PGD. Referring to the description of the second improvement, an address mapping relationship recorded in the PGD page table is an address translation relationship between a virtual address in the PGD space and a physical address occupied by the PGD. In addition, a PTE entry determined in a PTE page of the PGD page table according to the address mapping relationship points to the base address of the PGD, and the base address of the PGD page table is linked to a second PGD entry in the PGD page table such that the MMU can retrieve the base address of the PGD page table from the second PGD entry, and use the PGD page table to perform address translation.

To increase a safety factor of access to the PGD, the PGD space is large enough, and only some virtual addresses in the PGD space have a one-to-one address mapping relationship with physical addresses of the PGD page table. In this detailed implementation, the virtual addresses that have the address mapping relationship with the physical addresses of the PGD page table are referred to as preset addresses, while remaining virtual addresses in the PGD space (virtual addresses other than the preset addresses in the PGD space) do not have the address mapping relationship with physical addresses of the PGD page table, and therefore the MMU does not translate the remaining virtual addresses to the physical addresses of the PGD page table.

Figure 4:
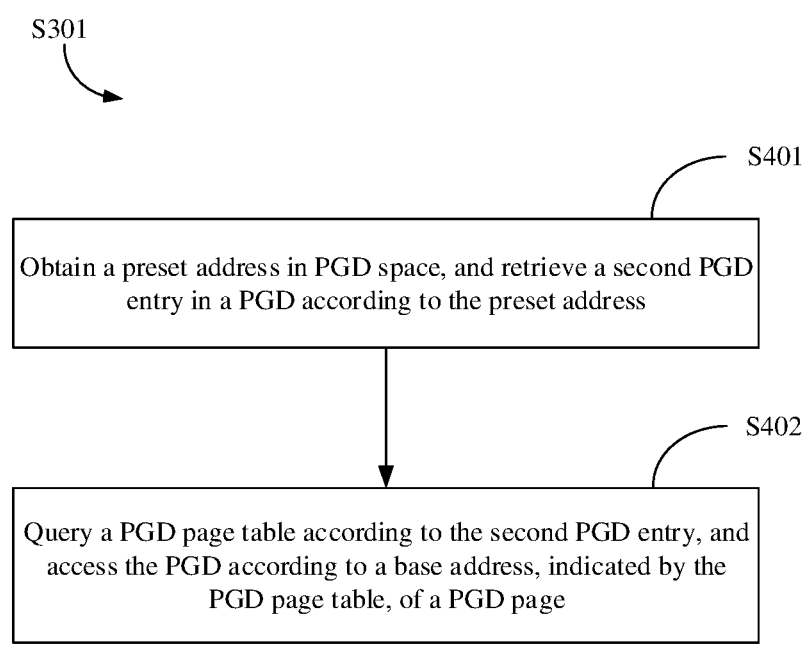
FIG. 4 is an optional detailed flowchart of step S301 in FIG. 3.

Correspondingly, step S301 is detailed. Referring to FIG. 4, the accessing the PGD using the PGD space includes step S401 and step S402.

Step S401: Obtain a preset address in the PGD space, and retrieve a second PGD entry in the PGD according to the preset address.

Step S402: Query the PGD page table according to the second PGD entry, and access the PGD according to the base address, indicated by the PGD page table, of the PGD page.

In this detailed implementation, a PGD entry, used to retrieve the preset address, in the PGD can be determined according to an address size of the preset address, and the determined PGD entry is the second PGD entry. Further, the PGD page table can be retrieved from the second PGD entry, and a PTE entry pointing to the base address (the first physical address of the PGD) of the PGD can be found in the PTE page of the PGD page table according to the preset address, when the preset address in the PGD space is operated, the PGD can be accessed.

Because the PGD space is obtained by dividing the user space of the process, the process can access the PGD space in the user mode. In this way, the process can access the PGD in user mode and modify data in the PGD entry (for example, the first PGD entry) in the user mode.

Figure 5:
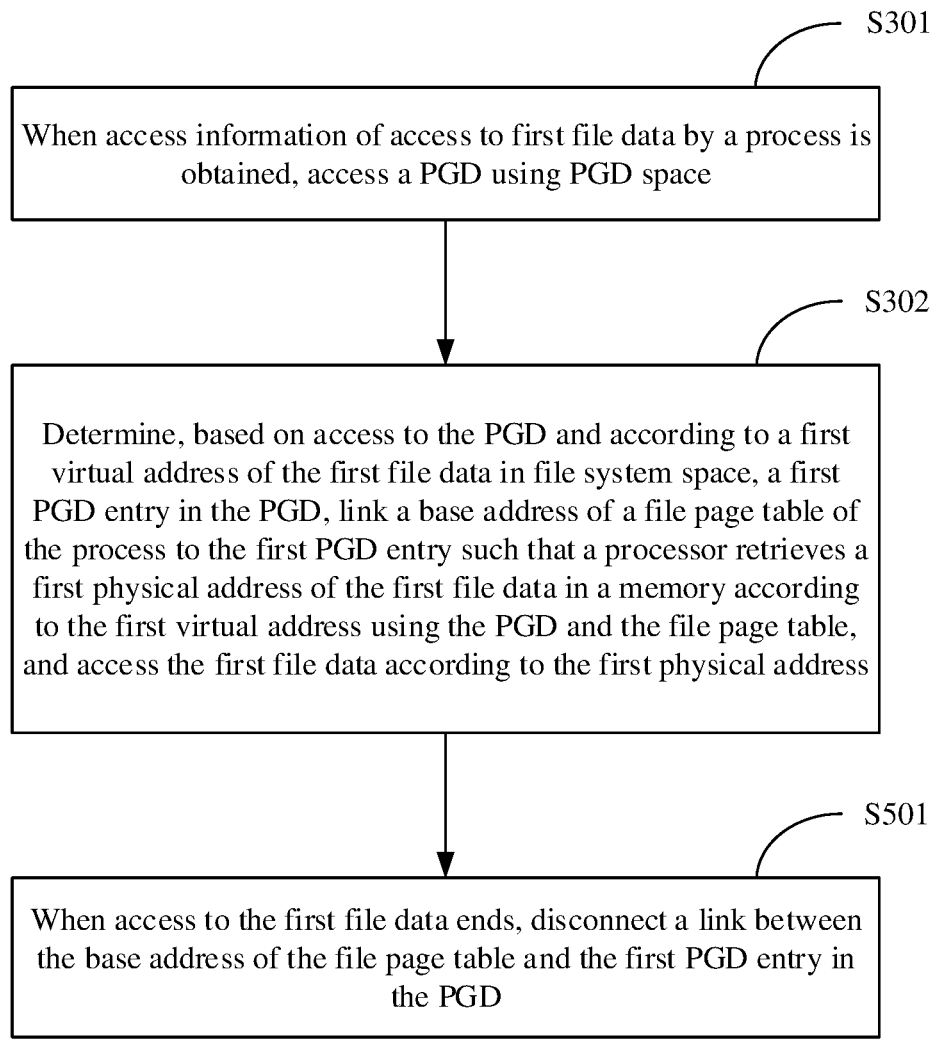
FIG. 5 is an optional detailed flowchart of the file data access method provided in FIG. 3.

In an optional detailed implementation of this method embodiment, referring to FIG. 5, the method further includes step S501.

Step S501: When access to the first file data ends, disconnect a link between the base address of the file page table and the first PGD entry in the PGD.

After accessing the first file data by the process by operating the file system space in the user mode ends, the process accesses the PGD again by operating the PGD space. The process accesses the first PGD entry in the PGD and clears the base address of the file page table recorded in the first PGD entry. A manner of clearing the base address of the file page table may be deleting the base address of the file page table recorded in the first PGD entry, or a manner of clearing the base address of the file page table may be writing other data to the first PGD entry. In this way, the MMU cannot retrieve the file page table from the first PGD entry. Therefore, the link between the base address of the file page table and the first PGD entry can be disconnected by clearing the base address of the file page table recorded in the first PGD entry.

This method is an implementation in which the first improvement is used in the embodiment. Step S302 of linking a base address of a file page table of the process to the first PGD entry and step S501 are performed using a file system interface function. In this way, when the first file data in the NVM is accessed by executing the file system interface function, the base address of the file page table of the process is first linked to the first PGD entry, and then access to the first file data can be implemented by operating the first virtual address. After access ends, the link between the base address of the file page table and the first PGD entry in the PGD is disconnected, and execution of the file system interface function is completed. It can be learned that access to the file data in the NVM can be implemented by executing the file system interface function. In other time in which the file system interface function is not executed to access the file data, the file page table cannot be retrieved from the first PGD entry, and the file data in the NVM cannot be accessed even if the file system space is operated. This increases the safety factor of access to the file data.

Figure 6:
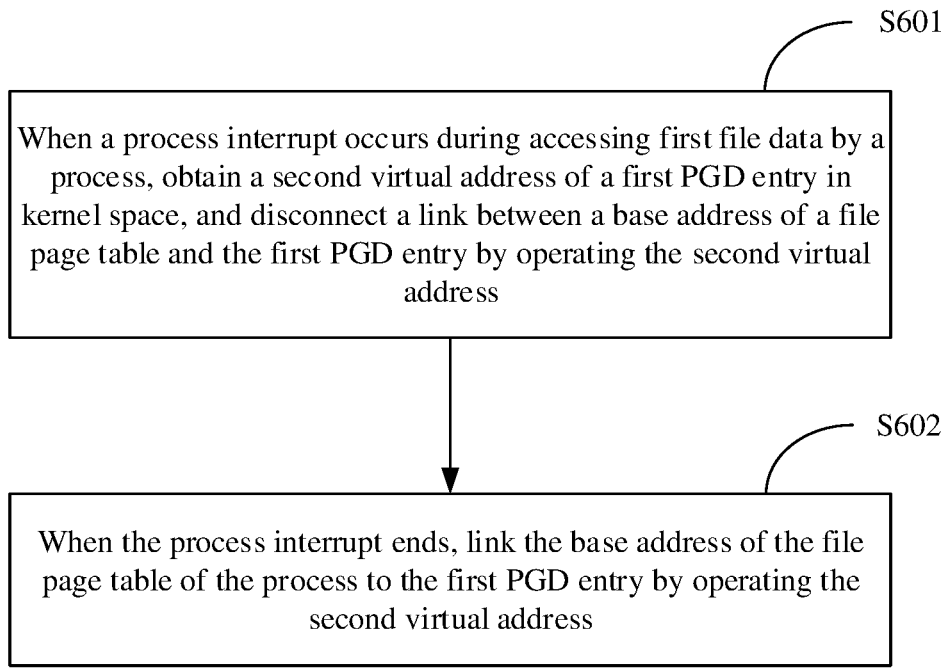
FIG. 6 is an example of an optional flowchart provided for interrupt processing in a file data access method.

In an optional detailed implementation of this method embodiment, referring to FIG. 6, the method further includes step S601 and step S602.

Step S601: When a process interrupt occurs during accessing the first file data by the process, obtain a second virtual address of the first PGD entry in the kernel space, and disconnect the link between the base address of the file page table and the first PGD entry by operating the second virtual address.

Step S602: When the process interrupt ends, link the base address of the file page table of the process to the first PGD entry by operating the second virtual address.

A person skilled in the art should understand that when the operating system initializes a process, the kernel space is allocated a virtual address of the PGD. A page table that records an address translation relationship between the virtual address of the PGD in the kernel space and a physical address of the PGD is linked in a page directory of a kernel. The kernel operates the virtual address of the PGD in the kernel space, and the MMU can retrieve the page table (which records the address translation relationship between the virtual address of the PGD in the kernel space and the physical address of the PGD) from the page directory of the kernel, to perform address translation. Therefore, the kernel can operate the virtual address of the PGD in the kernel space to access the entire PGD, including operating the second virtual address to access the first PGD entry. In this implementation, optionally, all processes established by the operating system share the kernel space.

In this implementation, software interrupts and hardware interrupts that may be included in process interrupts is preset. During accessing the first file data by the process, if any process interrupt occurs, the process is switched to a kernel mode, and the kernel executes an interrupt function corresponding to the process interrupt. The third improvement is used in this implementation to modify the interrupt function. In this case, at the beginning of the modified interrupt function, a second virtual address of the first PGD entry in the kernel space is obtained. The link between the base address of the file page table and the first PGD entry is disconnected by operating the second virtual address, and then interrupt processing is performed. At the end of the modified interrupt function, the base address of the file page table of the process is linked to the first PGD entry by operating the second virtual address, and finally, an interrupt return is executed after the modified interrupt function is executed.

It can be learned that during the interrupt processing, the file page table cannot be retrieved from the first PGD entry, and the file data in the NVM cannot be accessed without authorization even if the file system space is operated.

In an optional detailed implementation of this method embodiment, the method further includes accessing the first file data, in the process to another thread, obtaining the second virtual address of the first PGD entry in the kernel space, and disconnecting the link between the base address of the file page table and the first PGD entry by operating the second virtual address when a thread scheduler schedules a thread, and correspondingly, when the thread scheduler schedules the other thread to the thread, accessing the first file data, in the process, linking the base address of the file page table of the process to the first PGD entry by operating the second virtual address.

A person skilled in the art should understand that the thread scheduler runs in the kernel, allocates a time slice to each thread in the process, and therefore, scheduling between threads is performed when a time slice of a current thread has expired.

The fourth improvement is used in this implementation to modify a thread scheduling policy. With reference to the modified thread scheduling policy, the following describes a thread scheduling process provided in this implementation.

For ease of understanding, it is assumed that no thread needs to access the file data other than the thread accessing the first file data. When a time slice of the thread currently accessing the first file data has expired, the thread scheduler uses the modified thread scheduling policy to perform thread scheduling. Further, during scheduling of the currently executed thread that is accessing the first file data to another thread, the thread scheduler obtains the second virtual address of the first PGD entry in the kernel space, and disconnects the link between the base address of the file page table and the first PGD entry by operating the second virtual address.

When a time slice in which the other thread is executed has expired, the thread scheduler uses the modified thread scheduling policy to perform thread scheduling. Further, during scheduling of the other currently executed thread to the thread accessing the first file data, the thread scheduler links the base address of the file page table of the process to the first PGD entry by operating the second virtual address.

It can be learned that, when scheduling between multiple concurrently running threads is performed, the thread scheduler disconnects the link between the base address of the file page table and the first PGD entry before scheduling to another thread that does not need to access the file data in order to ensure that the other thread cannot access the file data in the NVM without authorization.

Certainly, if both threads before and after thread scheduling need to access file data in the NVM, respective file data that needs to be accessed by the two threads may be the same or different. During scheduling between the two threads, there is no need to operate the second virtual address to disconnect the link between the base address of the file page table and the first PGD entry.

In an optional detailed implementation with reference to this method embodiment or with reference to the foregoing implementations, the method further includes clearing a TLB entry corresponding to the file page table in a TLB table when the link between the base address of the file page table and the first PGD entry is disconnected.

Further, in the foregoing method embodiment or the detailed implementation, a purpose of disconnecting the link between the base address of the file page table and the first PGD entry is to prevent unauthorized access to the first file data in the NVM. However, when the file data is accessed before disconnection, a TLB entry that records an address mapping relationship between the first virtual address and the first physical address may be temporarily stored in the TLB table. If the TLB entry is temporarily stored in the TLB table, in this implementation, the TLB entry in the TLB table is further cleared in order to prevent performing address translation from the first virtual address to the first physical address according to the TLB entry when the first virtual address is operated without authentication and accessing the first file data without authentication. For example, when the process executes the file system interface function to disconnect the link between the first PGD entry and the base address of the file page table, the TLB entry corresponding to the file page table in the TLB table is cleared in this implementation.

For example, when the process executes an interrupt function to disconnect the link between the first PGD entry and the base address of the file page table, the TLB entry corresponding to the file page table in the TLB table is cleared in this implementation.

For example, when the thread scheduler disconnects the link between the first PGD entry and the base address of the file page table, the TLB entry corresponding to the file page table in the TLB table is cleared in this implementation.

In this implementation, optionally, to clear the TLB entry in the TLB table in the user mode, a new virtual address that does not belong to the file system space is operated, and a TLB entry at the virtual address is used to replace the TLB entry corresponding to the file page table and that is temporarily stored in the TLB table. In specific implementations, different replacement manners are used for TLB tables with different structures. For example, a first replacement manner is used for a TLB fully-associative structure. For another example, a second replacement manner is used for a TLB set-associative structure. For still another example, a third replacement manner is used for a TLB direct-associative structure.

System Embodiments of the Present Disclosure

In all computer systems provided in the following system embodiments and detailed implementations thereof, a single process performs processing. Certainly, the computer systems are also applicable to a case in which other processes in an operating system separately perform processing.

In a first system embodiment, a computer system provided in this system embodiment includes a processor and a memory, where the memory is an NVM, an operating system runs on the processor, and the operating system uses a file system to manage file data in the memory, and a process running on the operating system is allocated user space and kernel space during initialization of the process, where the user space of the process includes file system space and PGD space, the PGD space is virtual address space of a PGD and is used to be mapped to physical address space of the PGD in the memory, and the file system space is virtual address space of the file data and is used to be mapped to physical space of the file data in the memory.

Figure 7:
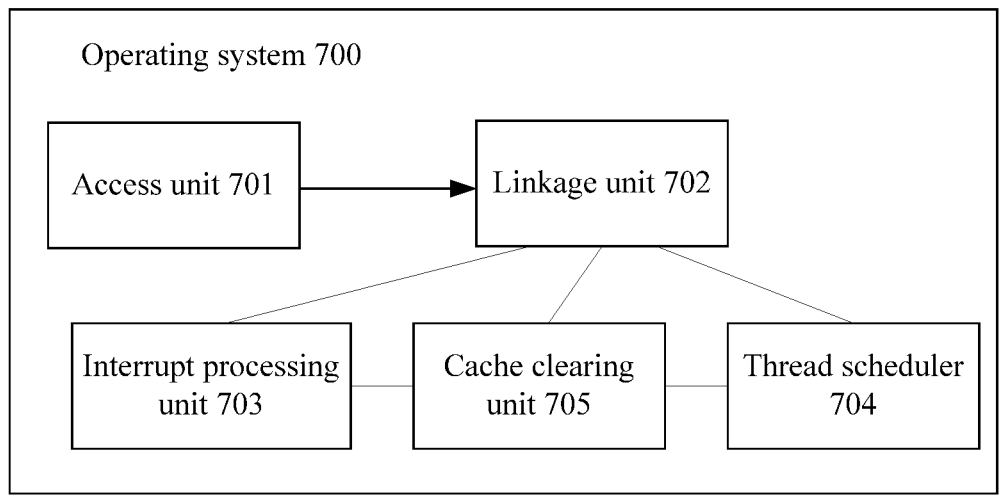
FIG. 7 is a schematic diagram of a logic implementation of an operating system.

The following provides an operating system in this system embodiment by means of an implementation of a software apparatus using an example. Referring to FIG. 7, an operating system 700 includes an access unit 701 and a linkage unit 702, where the access unit 701 is configured to access the PGD using the PGD space when access information of accessing first file data by the process is obtained, and the linkage unit 702 is configured to determine, based on access to the PGD and according to a first virtual address of the first file data in the file system space, a first PGD entry in the PGD, link a base address of a file page table of the process to the first PGD entry, where the file page table points to a physical address of the file data such that the processor retrieves a first physical address of the first file data in the memory according to the first virtual address using the PGD and the file page table, and access the first file data according to the first physical address.

In an optional detailed implementation of this system embodiment, when access to the first file data ends, the linkage unit 702 is configured to disconnect a link between the base address of the file page table and the first PGD entry in the PGD.

In an optional detailed implementation of this system embodiment, the memory further records a PGD page table, and the PGD page table points to a base address of the PGD. When accessing the PGD using the PGD space, the access unit 701 is further configured to obtain a preset address in the PGD space, retrieve a second PGD entry in the PGD according to the preset address, query the PGD page table according to the second PGD entry, and access the PGD according to the base address, indicated by the PGD page table, of the PGD page.

In an optional detailed implementation of this system embodiment, the operating system 700 further includes an interrupt processing unit 703.

When a process interrupt occurs during accessing the first file data by the process, the interrupt processing unit 703 is configured to obtain a second virtual address of the first PGD entry in the kernel space, and disconnect the link between the base address of the file page table and the first PGD entry by operating the second virtual address.

When the process interrupt ends, the interrupt processing unit 703 is configured to link the base address of the file page table of the process to the first PGD entry by operating the second virtual address.

In an optional detailed implementation of this system embodiment, the operating system 700 further includes a thread scheduler 704.

When scheduling a thread, accessing the first file data, in the process to another thread, the thread scheduler 704 is configured to obtain the second virtual address of the first PGD entry in the kernel space, and disconnect the link between the base address of the file page table and the first PGD entry by operating the second virtual address.

When scheduling the other thread to the thread, accessing the first file data, in the process, the thread scheduler 704 is configured to link the base address of the file page table of the process to the first PGD entry by operating the second virtual address.

In an optional detailed implementation with reference to the foregoing system embodiment or the foregoing optional detailed implementations, the operating system 700 further includes a cache clearing unit 705.

When the linkage unit 702 disconnects the link between the base address of the file page table and the first PGD entry, the cache clearing unit 705 is configured to clear a TLB entry corresponding to the file page table in a TLB table.

In a second system embodiment, the following provides this system embodiment by means of an implementation of a hardware apparatus using an example. Referring to FIG. 1, a computer system 100 provided in this system embodiment includes a processor 101 and a memory, where the processor 101 and the memory are connected using a memory bus 103, the memory is an NVM 102, an operating system runs on the processor 101, and the operating system uses a file system to manage file data in the memory.

A process running on the operating system is allocated user space and kernel space during initialization of the process, where the user space of the process includes file system space and PGD space, the PGD space is virtual address space of a PGD and is used to be mapped to physical address space of the PGD in the memory (i.e. the NVM 102), and the file system space is virtual address space of the file data and is used to be mapped to physical space of the file data in the memory (i.e. the NVM 102).

The NVM 102 is configured to store a computer executable instruction, and when the computer system 100 runs, the processor 101 reads the computer executable instruction stored in the NVM 102 such that the computer system 100 executes the file data access method according to the foregoing method embodiment or optional detailed implementations of the foregoing method embodiment.

The NVM 102 may store a complete computer executable instruction used for implementing the file data access method, or a computer executable instruction used for implementing the file data access method is stored in an external memory. The NVM 102 is used for temporally storing the computer executable instruction read from the external memory by the processor 101, that is, the NVM 102 stores only a part of the computer executable instruction required for current execution.

In the several embodiments provided in this application, it should be understood that the disclosed processor, computer system, and method may be implemented in other manners. For example, the described computer system embodiment is only an example. For example, unit division of an operating system is only logical function division and may be other division during implementation. For example, a plurality of modules, units, or components may be combined or integrated into another system or device, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts as units may or may not be physical modules, may be located in one position, or may be distributed on a plurality of network modules. Some or all the modules may be selected according to actual needs to achieve the objectives of the solutions of the embodiments.

In addition, functional units in the embodiments of the present disclosure may be integrated into one processing module, or each of the units may exist alone physically, or two or more units are integrated into one unit. The integrated unit may be implemented in a form of hardware, or may be implemented in a form of hardware in addition to a software functional unit.

The foregoing unit implemented for integration in a form of the software functional unit can be stored in a computer-readable storage medium, for example, stored in an NVM or stored in an external memory. The software functional unit is stored in a storage medium and includes several instructions for instructing a computer device (which may be a personal computer, a server, a network device, or the like) to perform some of the steps of the methods described in the embodiments of the present disclosure. The foregoing memory includes any medium that can store program code, such as a removable hard disk, a read-only memory (ROM), a random access memory (RAM), a magnetic disk, or an optical disc.

Finally, it should be noted that the foregoing embodiments are only intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the protection scope of the technical solutions of the embodiments of the present disclosure.

What is claimed is:

1. A file data access method, applied to a computer system comprising a processor and a memory comprising a non-volatile memory (NVM), wherein an operating system runs on the processor, and wherein the file data access method comprises:

accessing a page global directory (PGD) using PGD space when access information of accessing first file data by a process is obtained, wherein the operating system uses a file system to manage file data in the memory, wherein the process running on the operating system is allocated user space and kernel space during initialization of the process, wherein the user space of the process comprises file system space and the PGD space, wherein the PGD space comprises virtual address space of the PGD and is mapped to physical address space of the PGD in the memory, wherein the file system space comprises virtual address space of the file data and is mapped to physical space of the file data in the memory;

determining, based on access to the PGD and according to a first virtual address of the first file data in the file system space, a first PGD entry in the PGD;

creating a link between a base address of a file page table of the process to the first PGD entry, wherein the file page table points to a physical address of the file data;

retrieving a first physical address of the first file data in the memory according to the first virtual address using the PGD and the file page table;

accessing the first file data according to the first physical address; and disabling the link when access to the first file data ends.

2. The file data access method of claim 1, wherein the link is a pointer.

3. The file data access method of claim 1, further comprising recording a PGD page table pointing to a base address of the PGD, wherein accessing the PGD using the PGD space comprises:

obtaining a preset address in the PGD space;

retrieving a second PGD entry in the PGD according to the preset address;

querying the PGD page table according to the second PGD entry; and accessing the PGD according to the base address, indicated by the PGD page table, of the PGD.

4. The file data access method of claim 1, further comprising:

obtaining a second virtual address of the first PGD entry in the kernel space and further disabling the link by operating the second virtual address when a process interrupt occurs during accessing the first file data by the process; and linking the base address of the file page table of the process to the first PGD entry by operating the second virtual address when the process interrupt ends.

5. The file data access method of claim 1, further comprising:

accessing the first file data, in a process to another thread, obtaining a second virtual address of the first PGD entry in the kernel space and further disabling the link by operating the second virtual address when a thread scheduler schedules a thread; and accessing the first file data, in the process, and linking the base address of the file page table of the process to the first PGD entry by operating the second virtual address when the thread scheduler schedules the other thread.

6. The file data access method of claim 1, further comprising clearing a translation lookaside buffer (TLB) entry corresponding to the file page table in a TLB table when the link is disabled.

7. A computer system comprising:

a memory comprising a non-volatile memory (NVM) and configured to store an operating system, wherein the operating system comprises programming instructions; and a processor coupled to the memory and configured to execute the programming instructions to:

access a page global directory (PGD) using PGD space when access information of accessing first file data by a process is obtained, wherein the operating system uses a file system to manage file data in the memory, wherein the process running on the operating system is allocated user space and kernel space during initialization of the process, wherein the user space of the process comprises file system space and the PGD space, wherein the PGD space comprises virtual address space of the PGD and is mapped to physical address space of the PGD in the memory, wherein the file system space comprises virtual address space of the file data and is mapped to physical space of the file data in the memory;

determine, based on access to the PGD and according to a first virtual address of the first file data in the file system space, a first PGD entry in the PGD;

create a link between a base address of a file page table of the process to the first PGD entry, wherein the file page table points to a physical address of the file data;

retrieve a first physical address of the first file data in the memory according to the first virtual address using the PGD and the file page table;

access the first file data according to the first physical address; and disable the link when access to the first file data ends.

8. The computer system of claim 7, wherein the link is a pointer.

9. The computer system of claim 7, wherein the memory is further configured to record a PGD page table pointing to a base address of the PGD, and wherein the programming instructions further cause the processor to:

obtain a preset address in the PGD space;

retrieve a second PGD entry in the PGD according to the preset address;

query the PGD page table according to the second PGD entry; and access the PGD according to the base address, indicated by the PGD page table, of the PGD.

10. The computer system of claim 7, wherein the programming instructions further cause the processor to:

obtain a second virtual address of the first PGD entry in the kernel space and further disable the link by operating the second virtual address when a process interrupt occurs during accessing the first file data by the process; and link the base address of the file page table of the process to the first PGD entry by operating the second virtual address when the process interrupt ends.

11. The computer system of claim 7, wherein the operating system further comprises a thread scheduler, and wherein the programming instructions further cause the processor to:

access the first file data, in a process to another thread, obtain a second virtual address of the first PGD entry in the kernel space and further disable the link by operating the second virtual address when scheduling a thread; and access the first file data, in the process, and link the base address of the file page table of the process to the first PGD entry by operating the second virtual address when scheduling the other thread.

12. The computer system of claim 7, wherein the programming instructions further cause the processor to clear a translation lookaside buffer (TLB) entry corresponding to the file page table in a TLB table when the link is disabled.

13. A computer system comprising:
a memory comprising a non-volatile memory (NVM) and configured to store a computer executable instruction; and
a processor coupled to the memory and configured to execute the computer executable instruction to:
run an operating system;
access a page global directory (PGD) using PGD space when access information of accessing first file data by a process is obtained, wherein the operating system uses a file system to manage file data in the memory, wherein the process running on the operating system is allocated user space and kernel space during initialization of the process, wherein the user space of the process comprises file system space and the PGD space, wherein the PGD space comprises virtual address space of the PGD and is mapped to physical address space of the PGD in the memory, wherein the file system space comprises virtual address space of the file data and is mapped to physical space of the file data in the memory;
determine, based on access to the PGD and according to a first virtual address of the first file data in the file system space, a first PGD entry in the PGD;
create a link between a base address of a file page table of the process to the first PGD entry, wherein the file page table points to a physical address of the file data;
retrieve a first physical address of the first file data in the memory according to the first virtual address using the PGD and the file page table;
access the first file data according to the first physical address; and
disable the link when access to the first file data ends.

14. A computer program product comprising computer-executable instructions for storage on a non-transitory computer-readable medium that, when executed by a processor cause a computer system to:
run an operating system;
access a page global directory (PGD) using PGD space when access information of accessing first file data by a process is obtained, wherein the operating system uses a file system to manage file data in a memory of the computer system, wherein the process running on the operating system is allocated user space and kernel space during initialization of the process, wherein the user space of the process comprises file system space and the PGD space, wherein the PGD space comprises virtual address space of the PGD and is mapped to physical address space of the PGD in the memory, wherein the file system space comprises virtual address space of the file data and is mapped to physical space of the file data in the memory;
determine, based on access to the PGD and according to a first virtual address of the first file data in the file system space, a first PGD entry in the PGD;
create a link between a base address of a file page table of the process to the first PGD entry, wherein the file page table points to a physical address of the file data;
retrieve a first physical address of the first file data in the memory according to the first virtual address using the PGD and the file page table;
access the first file data according to the first physical address; and
disable the link when access to the first file data ends.

15. The computer program product of claim 14, wherein the link is a pointer.

16. The computer program product of claim 14, wherein the instructions further cause the computer system to:
record a PGD page table pointing to a base address of the PGD;
obtain a preset address in the PGD space;
retrieve a second PGD entry in the PGD according to the preset address;
query the PGD page table according to the second PGD entry; and
access the PGD according to the base address, indicated by the PGD page table, of the PGD.

17. The computer program product of claim 14, wherein the instructions further cause the computer system to:
obtain a second virtual address of the first PGD entry in the kernel space and further disable the link by operating the second virtual address when a process interrupt occurs during accessing the first file data by the process; and
link the base address of the file page table of the process to the first PGD entry by operating the second virtual address when the process interrupt ends.

18. The computer program product of claim 14, wherein the operating system comprises a thread scheduler, and wherein the instructions further cause the computer system to:
access the first file data, in a process to another thread, obtain a second virtual address of the first PGD entry in the kernel space and further disable the link by operating the second virtual address when a thread scheduler schedules a thread; and
access the first file data, in the process, and link the base address of the file page table of the process to the first PGD entry by operating the second virtual address when the thread scheduler schedules the other thread.

19. The computer program product of claim 14, wherein the instructions further cause the computer system to clear a translation lookaside buffer (TLB) entry corresponding to the file page table in a TLB table when the link is disabled.

20. The file data access method of claim 1, further comprising maintaining the link only when the file data needs to be accessed.

21. The file data access method of claim 1, wherein the access information indicates a status of access to the first file data by the process.

* * * * *